US010318738B2

(12) United States Patent
Smith et al.

(10) Patent No.: US 10,318,738 B2
(45) Date of Patent: Jun. 11, 2019

(54) DISTRIBUTED SECURE BOOT (71) Applicant: Intel Corporation, Santa Clara, CA (US)

(72) Inventors: Ned M. Smith, Beaverton, OR (US); Rajesh Poornachandran, Portland, OR (US)

(73) Assignee: Intel Corporation, Santa Clara, CA (US)

(*) Notice: Subject to any disclaimer, the term of this patent is extended or adjusted under 35 U.S.C. 154(b) by 148 days.

(21) Appl. No.: 15/391,166

(22) Filed: Dec. 27, 2016

(65) Prior Publication Data

US 2018/0181759 A1   Jun. 28, 2018

(51) Int. Cl.
H04L 9/32 (2006.01)
G06F 9/4401 (2018.01)
G06F 21/57 (2013.01)

(52) U.S. Cl.
CPC .......... G06F 21/575 (2013.01); G06F 9/4416 (2013.01); H04L 9/3239 (2013.01); H04L 9/3247 (2013.01); H04L 2209/38 (2013.01)

(58) Field of Classification Search
CPC ...... G06F 9/445; G06F 9/4401; G06F 9/4403; G06F 9/4406; G06F 9/4416; G06F 2221/2103; G06F 21/30; G06F 21/305; G06F 21/40; G06F 21/44; G06F 21/445; G06F 21/51; G06F 21/57; G06F 21/575; G06F 9/3247; G06F 9/0643; G06F 9/0637
See application file for complete search history.

(56) References Cited

U.S. PATENT DOCUMENTS

| | | | | |
|---|---|---|---|---|
| 7,266,475 | B1* | 9/2007 | Bade | G06F 21/577 702/182 |
| 7,275,102 | B2* | 9/2007 | Yeager | G06F 9/544 709/205 |
| 7,725,703 | B2* | 5/2010 | Hunter | G06F 21/575 380/259 |
| 7,882,221 | B2* | 2/2011 | Sailer | G06F 21/577 709/223 |
| 9,122,875 | B2* | 9/2015 | Bade | G06F 21/575 |
| 2003/0074548 | A1* | 4/2003 | Cromer | G06F 21/575 713/1 |
| 2004/0064457 | A1* | 4/2004 | Zimmer | G06F 21/575 |

(Continued)

OTHER PUBLICATIONS

Ng, "Trusted Platform Module TPM Fundamental", APTISS, Infineon Technologies Asia Pacific Pte Ltd, Infineon, Never Stop Thinking, Aug. 12, 2008, 40 pages. (Year: 2008).*

Primary Examiner — Jaweed A Abbaszadeh
Assistant Examiner — Brian J Corcoran
(74) Attorney, Agent, or Firm — Schwegman Lundberg & Woessner, P.A.

(57) ABSTRACT

Systems and methods may be used to securely booting multiple devices. A method may include initiating a boot sequence at a first device in an array of devices, booting a first distributed boot executive (DBE) on the first device, updating a Platform Configuration Register (PCR) with a first boot measurement, sharing the first boot measurement with a second DBE on a second device of the devices before booting a next boot step at the first device, receiving a second boot measurement from the second DBE, and booting the first device into a next boot stage in response to receiving the second boot measurement from the second DBE.

25 Claims, 7 Drawing Sheets (56) References Cited

U.S. PATENT DOCUMENTS

| | | | |
|---|---|---|---|
| 2005/0132202 A1* | 6/2005 | Dillaway | H04L 9/0825 713/179 |
| 2006/0005009 A1* | 1/2006 | Ball | G06F 21/57 713/155 |
| 2007/0179907 A1* | 8/2007 | Waris | G06F 21/575 705/76 |
| 2012/0084549 A1* | 4/2012 | Mackintosh | G06F 21/575 713/2 |
| 2016/0275461 A1* | 9/2016 | Sprague | G06Q 20/0655 |
| 2016/0283920 A1* | 9/2016 | Fisher | G06Q 20/065 |
| 2017/0041147 A1* | 2/2017 | Krahn | H04L 9/0897 |
| 2018/0004953 A1* | 1/2018 | Smith, II | H04L 63/1441 |

\* cited by examiner

| NODES → ↓ BOOT STAGES | 1 | 2 | ... | N |
|---|---|---|---|---|
| M1 | $[PCR_{M1}]_{K1}$ | $[PCR_{M1}]_{K2}$ | ... | $[PCR_{M1}]_{KN}$ |
| M2 ... | $[PCR_{M2}]_{K1}$ ... | $[PCR_{M2}]_{K2}$ ... | ... | $[PCR_{M2}]_{KN}$ ... |
| MN | $[PCR_{MN}]_{K1}$ | $[PCR_{MN}]_{K2}$ | ... | $[PCR_{MN}]_{KN}$ |

DISTRIBUTED SECURE BOOT

BACKGROUND

Trusted computing based on a Trusted Computing Group (TCG) Trusted Platform Module (TPM) defines both 'trusted' and 'secure' boot methods. Trusted boot measures boot code before the code executes and stores measurements in a TPM Platform Configuration Register (PCR). Even if trusted boot loads rogue code, that code is prevented from erasing or covering the stored PCR measurements. A network entity detects existence of rogue code and responds to remove the rogue code or isolate the platform from interacting with unaffected systems.

Secure boot takes enforcement a step further where a whitelist of known good measurements is used to compare boot measurements and prevent loading or executing of rogue code. Secure boot is intended to prevent damage to the host platform whereas trusted boot is intended to recover from the effects of rogue code.

Today, Internet connected systems are prevalent. The Internet-of-things gives rise to a new class of connected systems where the proper functioning of multiple connected systems is dependent on trusted booting, which is difficult to ensure in these systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for securely booting multiple devices are described herein. The systems and methods described herein coordinate a secure boot of multiple devices (e.g., IoT platforms or devices), such that a distributed application only executes when a Distributed Trusted Computing Base (DTCB) is available for the distributed application. The DTCB is used to identify from stored historical boot data to determine whether a device of a system has booted into an unsecure state or to recognize nodes that are booting outside of a specification. The systems described herein include a Distributed Boot Executive (DBE) on each device in an array of devices to control booting of each device. A Platform Configuration Register (PCR) may be used by the DBE to store a boot image, a hash, or another indication of boot results or history. As described above, the Trusted Computing Group (TCG) Trusted Platform Module (TPM) includes a secure boot and a trusted boot, however both of these options are insufficient to ensure security across distributed devices. For example, when a collection of identical or nearly identical devices are compromised with a virus or worm code, the peer devices are at extreme risk for quickly being compromised. Due to the cost involved in recovering each device separately, it is better to prevent all devices from booting (e.g., ensuring boot synchronization) in order to avoid a more expensive recovery scenario.

Many IoT applications include an array of devices that are identical. For example, lighting arrays, location beacons, air quality sensors, temperature sensors, etc., may include identical devices. A distributed application running on the array may function correctly or better when the array is functioning as a cohesive collection. The systems and methods described herein are used to synchronize booting of an array of IoT devices or an array of other identical devices based on trusted computing building blocks (such as those defined by TCG). In an example, each node in the array pauses booting until each node is known to have booted correctly to the secure boot check point.

In systems that do not use DBEs, nodes (e.g., devices in an array) may attempt to execute while other nodes are down due to localized secure boot failure, or may have booted rogue code. The systems and methods described herein use DBEs to detect discrete boot failures among array devices before application code on any node is permitted to execute. In an example, a DBE network may be divided into sub-networks where the DBEs forming a distributed TCB are part of a collection that enforces a first security policy and a second collection of TCBs enforce a second security policy. This allows for a gradient of service based on DBE sub-networks security policy evaluation.

Existing trusted boot systems use a centralized trust broker that may be consulted to evaluate compliance to whitelist policies and to recover systems that may be infected with rogue code. The systems and methods described herein may use a distributed whitelist with coordination by the DBEs to enable localized secure boot nodes to implement a secure boot policy in the context of participation in a distributed application.

Secure boot check point coordination includes first securely booting a DBE to coordinate sending and receiving measurements from each of the other array devices. The DBE may compare the measurements from the other array devices to a whitelist of expected measurements. In an example, when using an array, checking the whitelist may include using a whitelist on a device of the array to check measurements of the device or to verify peer node measurements. This may avoid using a centralized trust broker service or cloud-based executive, in an example. When each node cross-verifies every other node in the array, the respective DBEs may measure a next module (e.g., an image of an operating system and an application) and share the measurement with peer DBEs. When peer DBEs respond with affirmative whitelist checks, the DBEs may transfer execution thread to device images respectively.

Boot stages described herein may pertain to devices having a DBE that enforces an array security policy. Security policies may be expressed in terms of an application type that may be booted subsequently. By measuring the application type node specialization may be enabled among a multi-node network (e.g., an IoT network) with the devices in the network working together to implement a common distributed application. In an example, the DBE may be implemented using a variety of distributed computing coordination technologies including distributed ledgers, publish-subscribe, mesh, or the like.

Figure 1A:
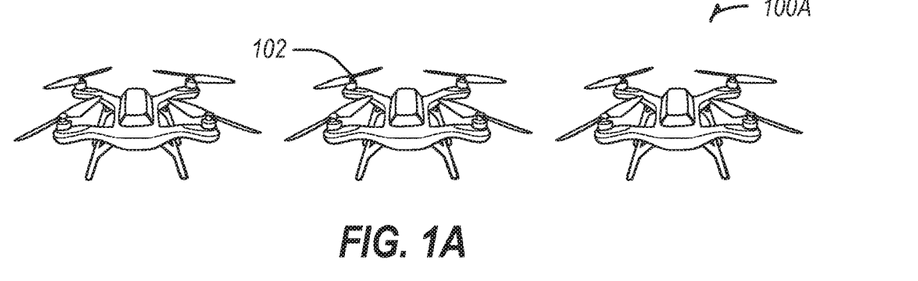
FIGS. 1A-1D illustrate systems for securely booting distributed devices in accordance with some embodiments.
Figure 1B:
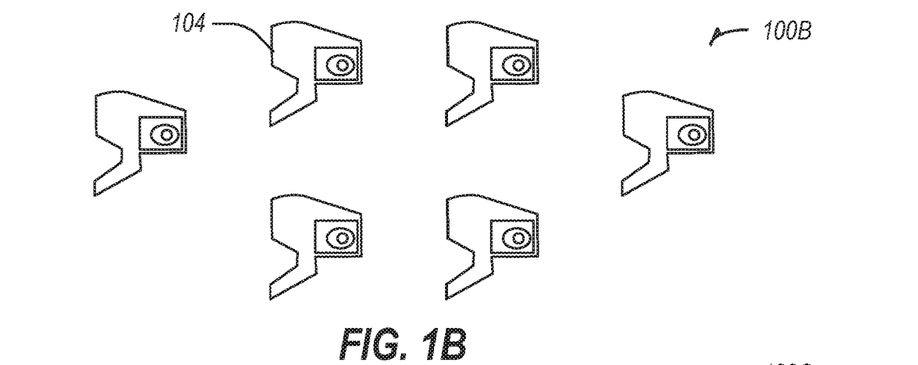
Figure 1C:
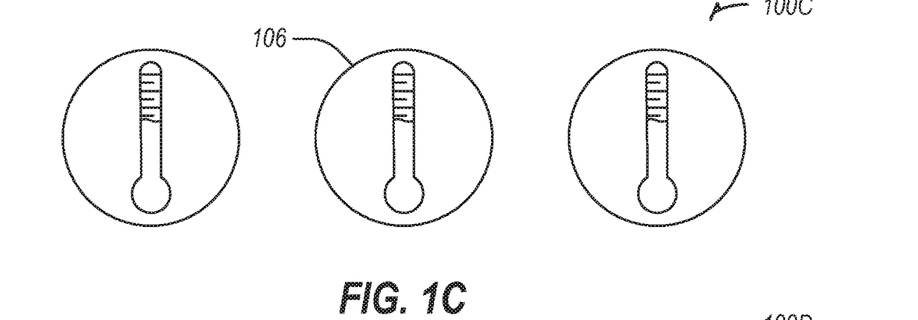
Figure 1D:
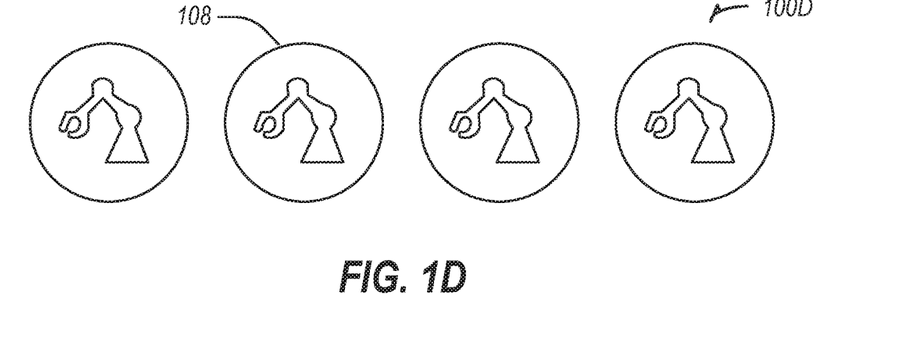

FIGS. 1A-1D illustrate systems 100A-100D for securely booting distributed devices in accordance with some embodiments. FIG. 1A illustrates an array of drones, such as drone 102. FIG. 1B illustrates an array of cameras, such as camera 104. FIG. 1C illustrates an array of home sensors, such as a temperature sensor 106. FIG. 1D illustrates an array of industrial sensors, such as sensor 108. The array of cameras in FIG. 1B may include closed circuit cameras, a smart camera grid or store, or the like. The industrial sensors of FIG. 1D may include industrial process control equipment or sensors, or the like. Other examples may include devices that run containers after booting, such as an operating system level virtualization or other software containers. In an example, any array may be used when devices in the array have the same architecture, hardware, and boot loader.

Figure 2:
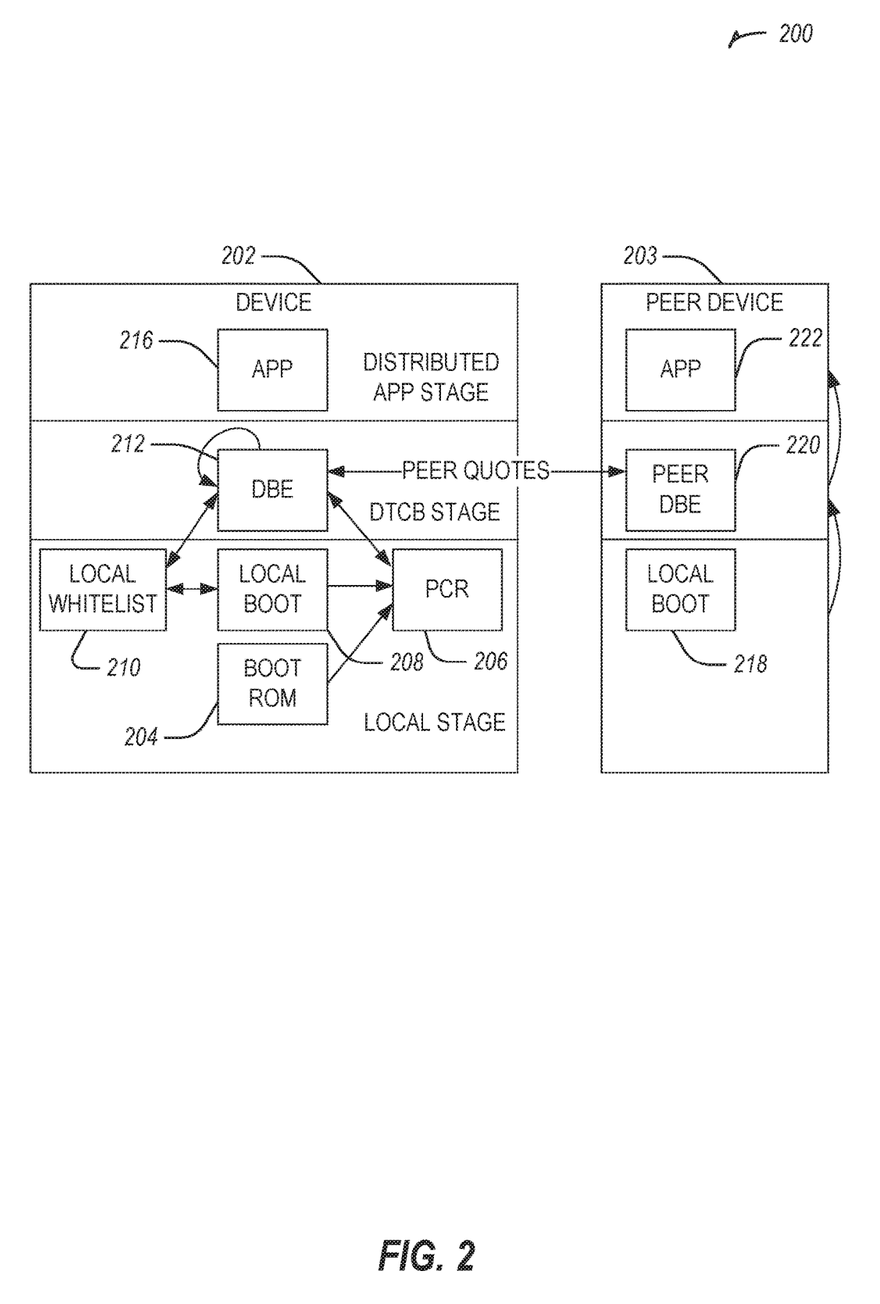
FIG. 2 illustrates system architecture for distributed boot devices in accordance with some embodiments.

FIG. 2 illustrates system architecture 200 for distributed boot devices in accordance with some embodiments. The system architecture 200 for a distributed boot system includes a DBE 212 to coordinate peer node boot stage advancement. A trusted or secure boot method may be applied locally on a per-node basis. First, a local stage may be initiated using a boot ROM 204 to initiate a device 202. A local whitelist 210 may be applied to enforce a secure boot semantic. A PCR 206 may be used to capture context of a local boot 208. The local boot 208 may end with measurement and boot of the DBE 212. The local whitelist 210 may contain a DBE measurement to verify the DBE 212 such that only the intended DBE 212 is permitted to run while the distributed TCB is established.

The DBE 212 may be used to coordinate with a peer DBE 220 on a peer device 203 in a DTCB stage. The DBE 212 and the peer DBE 220 may send or receive peer quotes. Before moving to a next boot stage, the DBE 212 may receive verification information or measurements from the peer DBE 220, which may receive information or measurements from the DBE 212. The peer DBE 220 may boot from a local boot 218 to a DTCB stage at the peer device 203. The PCR 206 may store the measurements received from the peer DBE 220, which may be checked against the local whitelist 210. The PCR 206 may store the measurements as a hash (e.g., a SHA-2 hash), an image, or the like. The PCR 206 may be updated to include measurements front various stages of boot during TPM to create an immutable record of how the device 202 booted from a moment of power up to a current execution cycle (or to handoff to the app 216). In an example, the device 202 and the peer device 203 may be a part of an array of devices (IoT devices) and may be identical in hardware and architecture.

In an example, the PCR 206 is assigned an asymmetric key. The DBE 212 may send a stored measurement or hash from the PCR signed by the asymmetric key to the peer DBE 220 for verification by the per device 203. The peer DBE 220 may access a whitelist stored on the peer device 203 or stored remotely to the per device 203 to verify the measurement or hash.

The DBE 212 and the peer DBE 220 may verify signatures of the PCR key over peer quotes to ensure authenticity. Peer quoting may include using multiple devices to create and verify PCR keys. For example, the DBE 212 accesses the PCR 206 boot information for a boot stage, compares it to the local whitelist 210 data, and validates that boot stage for the device 202.

The DBE 212 may then use the local whitelist 210 to compare the information received from the peer DBE 220 for the boot of the peer device 203, and validate the peer device 203 boot stage based on the comparison. When the device 202 and the peer device 203 are part of an array including additional devices, the DBE 212 may compare received information from DBEs of the additional devices to the information in the local whitelist 210 to validate the additional devices. In an example, when all of the devices in the array are validated at the boot stage, the DBE 212 may proceed to a next boot stage.

In another example, when a device in the array is not validated by the DBE 212, the DBE 212 may send an indication to other devices in the array, write to a blockchain, or otherwise indicate that the device in the array is not to be trusted. The DBE 212 may send an indication to the untrusted device to alert the untrusted device that it has an issue. In yet another example, the peer device 203 may be on a different boot stage, and the DBE 212 may wait until the peer device 203 is on the same boot stage, or may catch up to the peer device 203 if the DBE 212 is at a lagging boot stage. In an example, when there is an issue with an array device boot, the devices in the array may "vote" or compare images to determine which image is held by a majority of devices in the array. This may prevent hijacking of a device or even multiple devices so long as a majority of devices in the array are still untouched. The local whitelist 210 may store the blockchain. The blockchain may include a proof of work blockchain protocol to identify a majority of blockchain devices that agree on an image, and select that image as the correct image, such as by using a simple majority rule for consensus truth. Consensus truth may be sticky in blockchain. (e.g., difficult to displace) by using the DBE 212 to check at a next boot whether the next boot matches a previous boot image or a series of previous boot images by devices in the array. Some blockchain implementations such as Bitcoin use a 'majority rule' policy for determining 'consensus truth.' In other examples, a 'super-majority' or 100% majority policy (or 99%, 98%, etc.) may be used, for example, to better ensure consistency across the collection.

At a certain point in the boot steps the DBE 212 may identify or be alerted that a "sufficient" boot stage has been achieved by the device 202, and the DBE 212 may pass control of the device 202 to the app 216 and enter a distributed app stage. The peer device 203 may also enter the distributed app stage at this time. For example, the DBE 212 may measure the operating system, check a bootloader, and move control to the app 216. In another example, an application whitelist may be used and the DBE 212 may keep control of the device 202 while the app 216 is operating. The peer DBE 220 may move the peer device 203 to an app stage 222.

Figure 3:
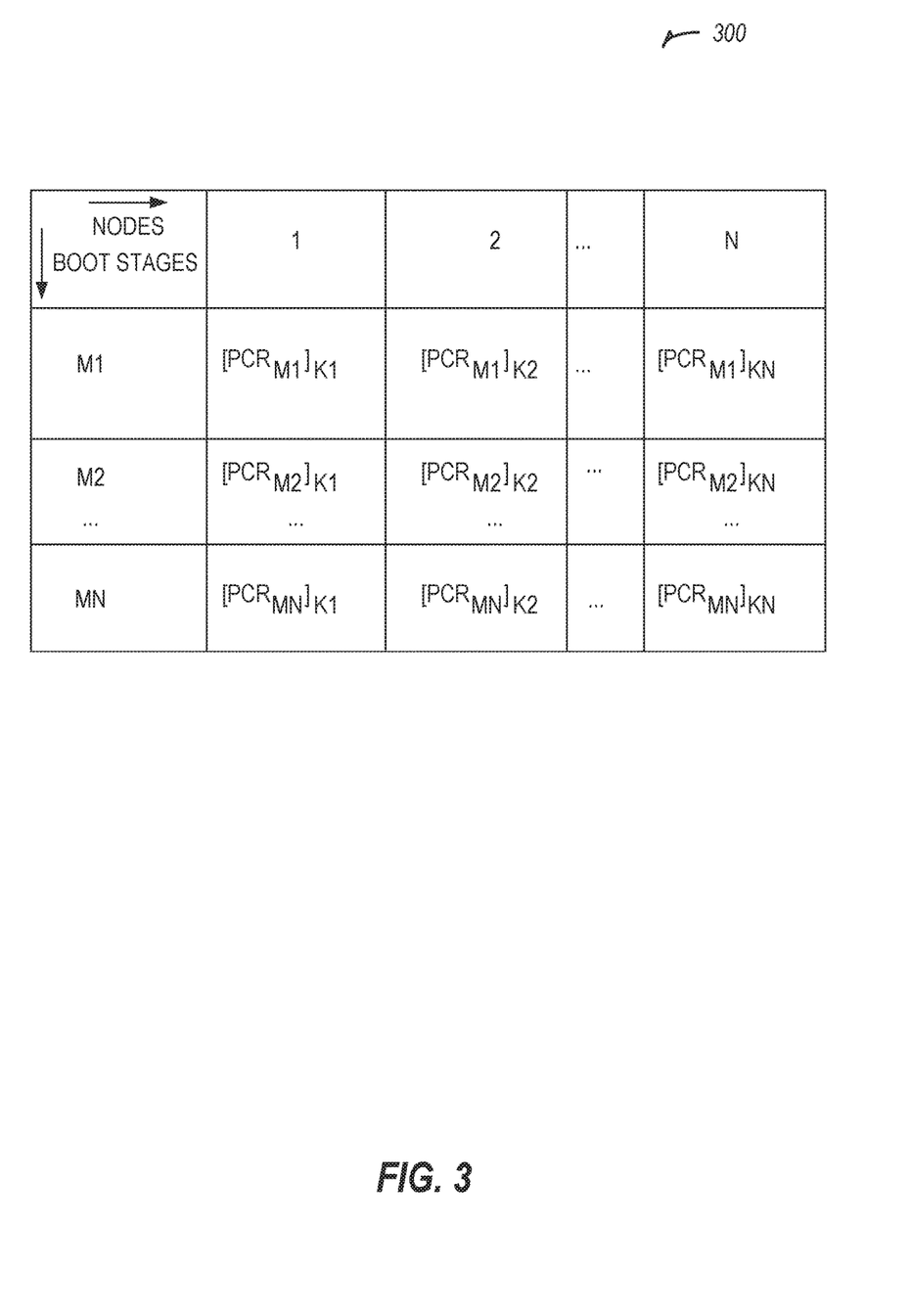
FIG. 3 illustrates boot stages of a distributed device array in accordance with some embodiments.

FIG. 3 illustrates boot stages 300 of a distributed device array in accordance with some embodiments. The boot stages 300 may include MN boot stages, starting with a M1 boot stage. The distributed device array may include N devices, each with a PCR and a DBE. For each node in the array the DBF may measure loadable images into PCR registers that may be quoted (e.g., signed by a quoting key) and shared with peer DBEs at different stages of booting the N devices. DBEs may coordinate (e.g., synchronize) to allow the devices to progress to a next boot stage. In an example, coordination may be applied at each boot stage to prevent rogue code from being executed on any of the devices in the distributed device array 300.

In an example, devices in the distributed device array may proceed to a next stage at a coordinated point. For example, the devices may move from M1 to M2, and all devices may complete M1 before moving to M2. In an example, a DBE may coordinate using a blockchain, for example, when a device boots to stage M1, then the device may post to the blockchain. The device may monitor the blockchain to determine when device "N" updates of reaching the boot stage, and when other devices update the blockchain by indicating that they have reached the M1 stage and N updates are reached, the device may submit a transaction to the blockchain indicating that the M1 stage has been achieved. In an example, in response to all DBEs verifying, use the blockchain updating procedure may update for a next boot stage M2.

In an example, a device in the distributed device array may use a whitelist with multiple images, for example, multiple versions with a current version, a past update version, or a recovery version, to determine validity. In another example, the whitelist may be contingent, for example when a first boot stage M1 has an image of A, then the second boot stage M2 may be B or C, and if the first boot stage M1 has an image of D, then the second boot stage M2 may be B or D. In an example, a boot stage (e.g., a second boot stage M2) may be defined by a bootstrap loader. The bootstrap loader may include a grub bootloader.

Figure 4:
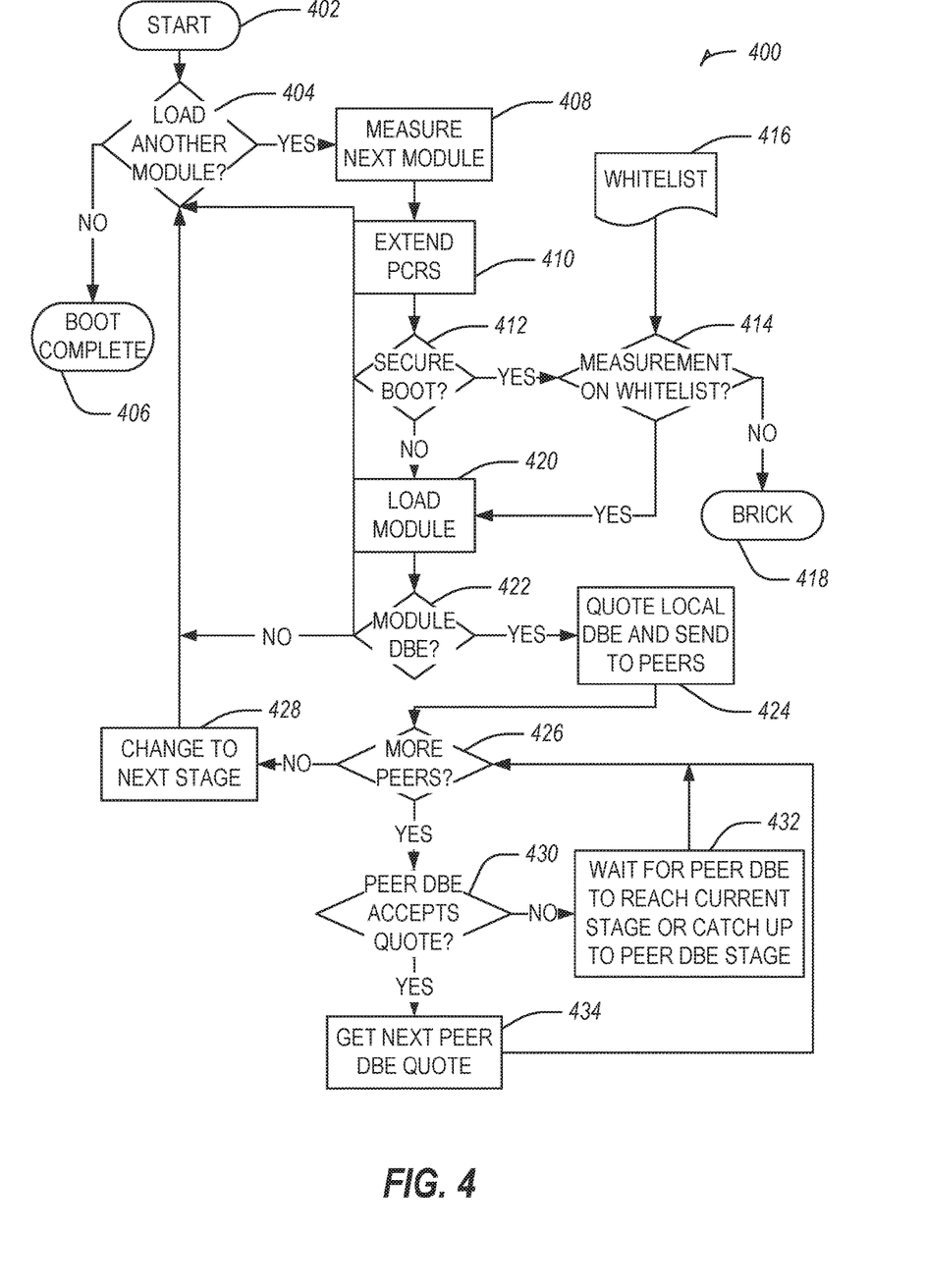
FIG. 4 illustrates an operational flow chart illustrating a technique for secure booting devices in accordance with some embodiments.

FIG. 4 illustrates an operational flow chart illustrating a technique 400 for secure booting devices in accordance with some embodiments. The technique 400 starts at an initial operation 402 which may include using boot rom or powering up a device in a device array. The technique 400 includes a decision block 404 to determine whether to load another module. When there are no additional modules to load, the technique 400 may end and the boot may be complete at 406. When another module is available or intended to be loaded, the technique 400 proceeds to operation 408 to measure the a next module. After measurement 408, the technique 400 includes an operation to extend PCRs 410, and determine whether the boot is a secure boot at decision 412. If the boot is not a secure boot, the technique 40 may move on to loading the module at operation 420. If the boot is secure, the technique 400 includes determining whether the measurement is on a whitelist 416 at decision 414. In an example, if the measurement is not on the whitelist 416, the technique 400 may include bricking the device at 418 or causing some other policy-based decision to be enacted regarding the device. In another example, if the measurement is not on the whitelist 416, the technique 400 may include removing the device from the device array.

In response to determining that the measurement is on the whitelist 416 at decision 414, the technique proceeds to load the module at operation 420. After the module is loaded, the technique 400 includes determining whether the module is a DBE controlled module at operation 422. If not, the technique 400 may include returning to operation 404 to determine whether to load another module. In response to determining that the module is a DBE controlled module at operation 422, the technique includes using a local DBE to prepare a quote of a measurement, an image, a hash, or other information to send to a peer DBE at operation 424.

The technique 400 includes a decision 426 to determine whether there are peer DBEs available to send the quote. If not, the technique 400 includes using the DBE to change to a next boot stage (e.g., accept the module as secure) and return to the decision block 404 to determine whether to load another module. In response to determining that there are peer DBEs available, the DBE may receive an indication of whether a peer DBE accepts the quote at decision 430. In response to receiving an indication that the peer DBE accepts the quote, the technique 400 includes receiving a next peer DBE quote at operation 434. In an example, in response to receiving an indication that the peer DBE does not accept the quote, the technique 400 includes an operation 432 to wait for the peer DBE to reach a current stage. In another example, in response to receiving an indication that the peer DBE does not accept the quote, the technique 400 includes the operation 432 to cause the device to catch up to the peer DBE stage. In yet another example, in response to receiving an indication that the peer DBE does not accept the quote, the technique 400 includes an operation to brick the device or causing some other policy-based decision to be enacted regarding the device, for example, when a majority of peer DBEs reject the quote. In an example, in response to determining one or more peer DBEs do not accept the quote, the technique 400 may include using the peer DBEs to create a blacklist to prevent the device from being booted to the array. For example, the technique 400 may include creating a new key and moving the peer DBEs and PCRs to the new key while leaving out the DBE on the device. The technique 400 may return to decision 426 to determine whether there are additional peers available in response to operation 432 or 434. In an example, after receiving a quote, each device may publish the quote to peer DBEs for verification and simultaneously aggregate DBE acceptance from peer devices.

In an example, the DBE contains network access functionality that allows the DBE to communicate with the peer DBEs. Access to the network may pose an increased security risk which may be mitigated by limiting the functionality of the DBE on the network to operations specifically required to perform DBE functions. Firewalls or manageability engine techniques may be employed to restrict and protect against network threats.

The DBE may message a peer DBE using known techniques such as publish-subscribe, multi-cast, broadcast, mesh routing, or multi-unicast. Messages may be protected according to PCR quoting techniques. Whitelist provisioning may be initially achieved as part of DBE software installation and update mechanisms. Subsequent whitelist provisioning may be achieved using DBE signing keys and distributed computing messaging capabilities. In an example, the DBE messaging capability may be separate from that used by the IoT array or distributed application for added hardening and isolation. In an example, the DBE uses blockchain synchronization techniques, where the DBE may be a blockchain 'miners' and the measurements from the local platform boot inclusive of the DBE may form a transaction. Each DBE may create a similar transaction. Each miner may verify the received transaction using a local whitelist or measurement of itself. In an example, consensus threshold may be established when 100% of miners agree that every DBE transaction is valid, in another example, a majority of miners agreeing may be the consensus threshold. In yet another example, a super-majority may be used. After the consensus threshold is reached, the DBE may allow a next module to be loaded.

In an example, the whitelist may include a previously successfully booted image (or a series of previously successfully booted images). The whitelist may include a majority, super-majority or percentage of peer devices, each having the same image. In an example, the 'same' may include slight changes to the image, such as a current or a past version of the image. In another example, a collection of devices that differ in device type may be similar enough as to fall within the security concern of above mentioned attack scenarios such that an orchestrated boot is used. The images may vary and still be considered the 'same.' For example, acceptable images may be defined in terms of a policy that describes a list of whitelist images deemed to be acceptable for a given collection of devices.

Figure 5:
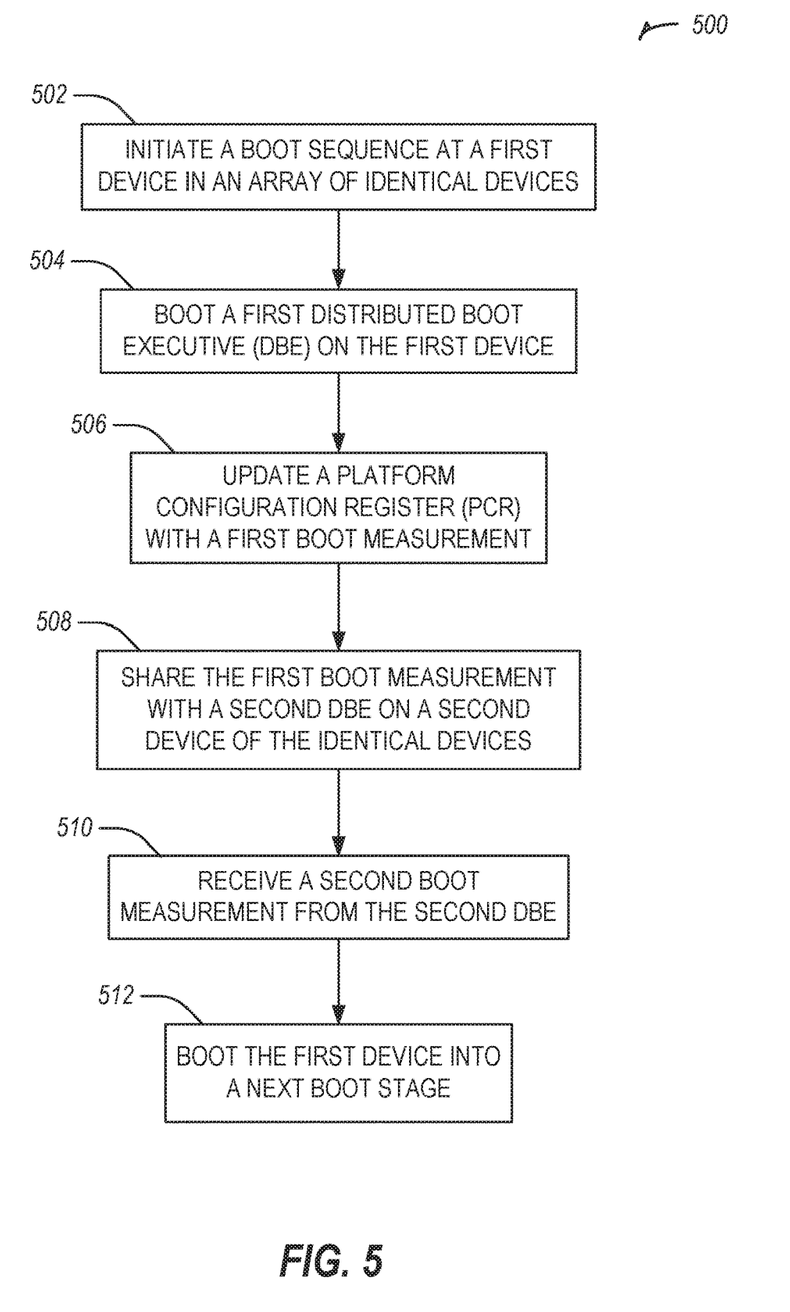
FIG. 5 illustrates a flowchart showing a technique for securely booting multiple devices in accordance with some embodiments.

FIG. 5 illustrates a flowchart showing a technique 500 for securely booting multiple devices in accordance with some embodiments. The technique 500 includes an operation 502 to initiate a boot sequence at a first device in an array of identical devices. In an example, the identical devices may include drones, cameras, industrial process control equipment, Internet of Things (IoT) devices, or the like. The technique 500 includes an operation 504 to boot a first DBE on the first device. The first DBE may be implemented using a distributed computing coordination technique including one or more of a distributed ledger, a publish-subscribe technique, a mesh technique, or the like.

The technique 500 includes an operation 506 to update a PCR with a first boot measurement. In an example, the first boot measurement may be stored as an image, a hash (e.g., a SHA-2 hash), or the like. The PCR may store the boot measurement as an immutable record. The technique 500 includes an operation 508 to share the first boot measurement with a second DBE on a second device of the array of identical devices. Operation 508 may share the first boot measurement before booting a next boot step at the first device. The technique 500 includes an operation 510 to receive a second boot measurement from the second DBE. In an example, the second boot measurement and the first boot measurement correspond to an initial boot stage, and the first device and the second device may have both completed the initial boot stage and not completed the next boot stage.

The technique 500 includes an operation 512 to boot the first device into a next boot stage. In an example, operation 512 may occur only after majority peer verification of the first boot measurement. The technique 500 may include an operation to compare the second boot measurement to a local whitelist to determine whether the second boot measurement is valid. Booting the first device into the next boot stage may include booting the first device to the next boot stage in response to determining that the second boot measurement is valid. In an example, determining whether the second boot measurement is valid includes verifying a signature of the second boot measurement. The local whitelist may include a blockchain, which may store measurements, such as the first boot measurement or the second boot measurement. The technique 500 may include writing the first boot measurement to the blockchain or determining whether the second boot measurement is valid by comparing the second boot measurement to one or more measurements stored in the blockchain. In an example, in response to determining that the second boot measurement is invalid (e.g., that the second boot measurement is not verified as being on the local whitelist or in the blockchain), removing the second device from a list of the identical devices. The list may be stored at the first device, such as in the blockchain or a PCR.

In an example, booting the first device into the next boot stage may include booting the first device into the next boot stage in response to receiving a boot measurement from respective DBEs of all of the identical devices. The technique 500 may include signing the first boot measurement with a quoting key. The quoting key may include an asymmetric key assigned to the PCR to be used in peer quoting, such as sending measurements from the first DBE to a peer DBE. The technique 500 may include an operation to compare the first boot measurement to a local whitelist to determine whether the first boot measurement is valid. In an example, sharing the first boot measurement with the second DBE may include sharing the first boot measurement in response to determining that the first boot measurement is valid. In an example, logic or techniques herein may be processed in a trusted execution environment. In an example, based on a policy configuration, a sub-set of devices may be allowed to operate in a first boot stage while remaining nodes that passed or failed the first boot stage may operate at a second boot stage.

Figure 6:
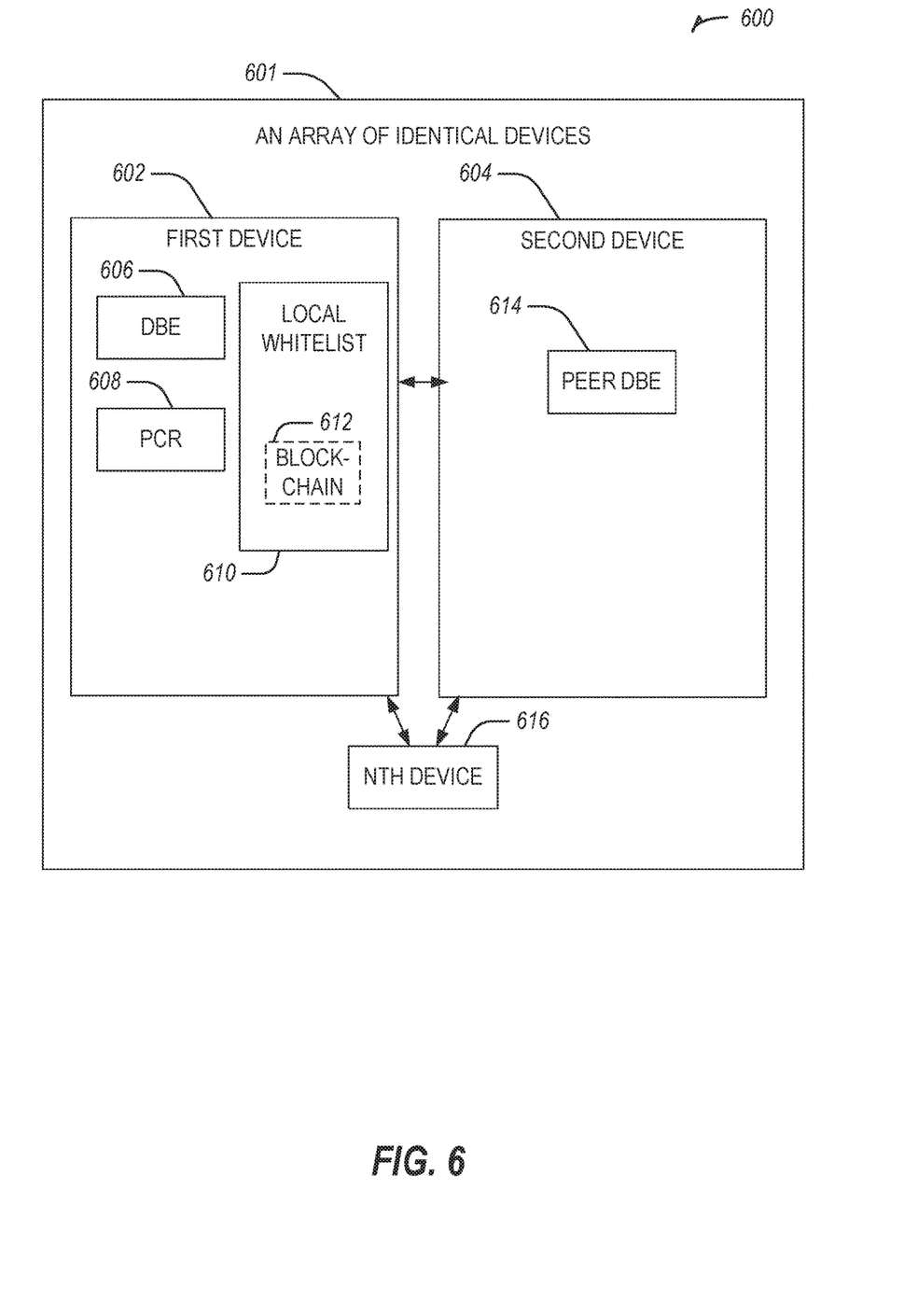
FIG. 6 illustrates a system for securely booting multiple devices in accordance with some embodiments.

FIG. 6 illustrates a system 600 for securely booting multiple devices in accordance with some embodiments. The system 600 includes a first device 602 of an array of identical devices 601, which may communicate with a second device 604 of the array of identical devices 601. The array of identical devices 601 may include additional devices, such as an Nth device 616. The first device 602 includes a DBE 606, a PCR 608, and a local whitelist 610. In an example, the local whitelist 610 may include a blockchain 612. The DBE 606 may write measurements to the blockchain 612 or read measurements from the blockchain 612. The second device 604 includes a peer DBE 614 (e.g., a second DBE), which may communicate with the DBE 606.

The first device 602 may initiate a boot sequence and boot the DBE 606. The DBE 606 may update the PCR 608 with a first boot measurement and share the first boot measurement with the peer DBE 614 on the second device 604. In an example, the PCR 608 may store the first boot measurement as an immutable record. The first boot measurement may be stored as an image, measurement data, a hash (e.g., a SHA-2 hash), or the like.

In an example, the first boot measurement may be shared by the DBE 606 before booting the first device 602 to a next boot stage. The DBE 606 may receive a second boot measurement from the peer DBE 614, and in response, boot the first device 602 into the next boot stage. The DBE 606 may be implemented using a distributed computing coordination technique including one or more of a distributed ledger, a publish-subscribe technique, a mesh technique, or the like.

In an example, the DBE 606 may compare the second boot measurement to the local whitelist 610 to determine whether the second boot measurement is valid. Booting the first device 602 into the next boot stage may include using the DBE 606 to boot the first device 602 into the next boot stage in response to the DBE 606 determining that the second boot measurement is valid. Determining whether the second boot measurement is valid may include verifying a signature of the second boot measurement with the DBE 606.

The DBE 606 may remove the second device from a list of the identical devices stored at the first device in response to determining that the second boot measurement is invalid. To boot the first device 602 into the next boot stage, the DBE 606 may boot the first device 602 into the next boot stage in response to receiving a boot measurement from respective DBEs of all of the devices in the array of identical devices 601. The devices in the array of identical devices 601 may include drones, cameras, industrial process control equipment, Internet of Things (IoT) devices, or the like.

The DBE 606 may sign the first boot measurement with a quoting key, for example, an asymmetric key assigned to the PCR 608 and used to send quotes to the peer DBE 614.

In an example, the second boot measurement and the first boot measurement correspond to an initial boot stage, wherein the first device 602 and the second device 604 both may have completed the initial boot stage and not have completed the next boot stage when the DBE 606 sends the quote to the peer DBE 614. In an example, the DBE 606 may compare the first boot measurement to the local whitelist 610 to determine whether the first boot measurement is valid. In an example, to share the first boot measurement with the peer DBE 614, the DBE 606 may share the first boot measurement in response to determining that the first boot measurement is valid. In an example, the system 600 may include a trusted execution environment for execution of logic or techniques described herein. In an example, based on a policy configuration, a sub-set of devices may be allowed to operate in a first boot stage while remaining nodes that passed or failed the first boot stage may operate at a second boot stage.

Figure 7:
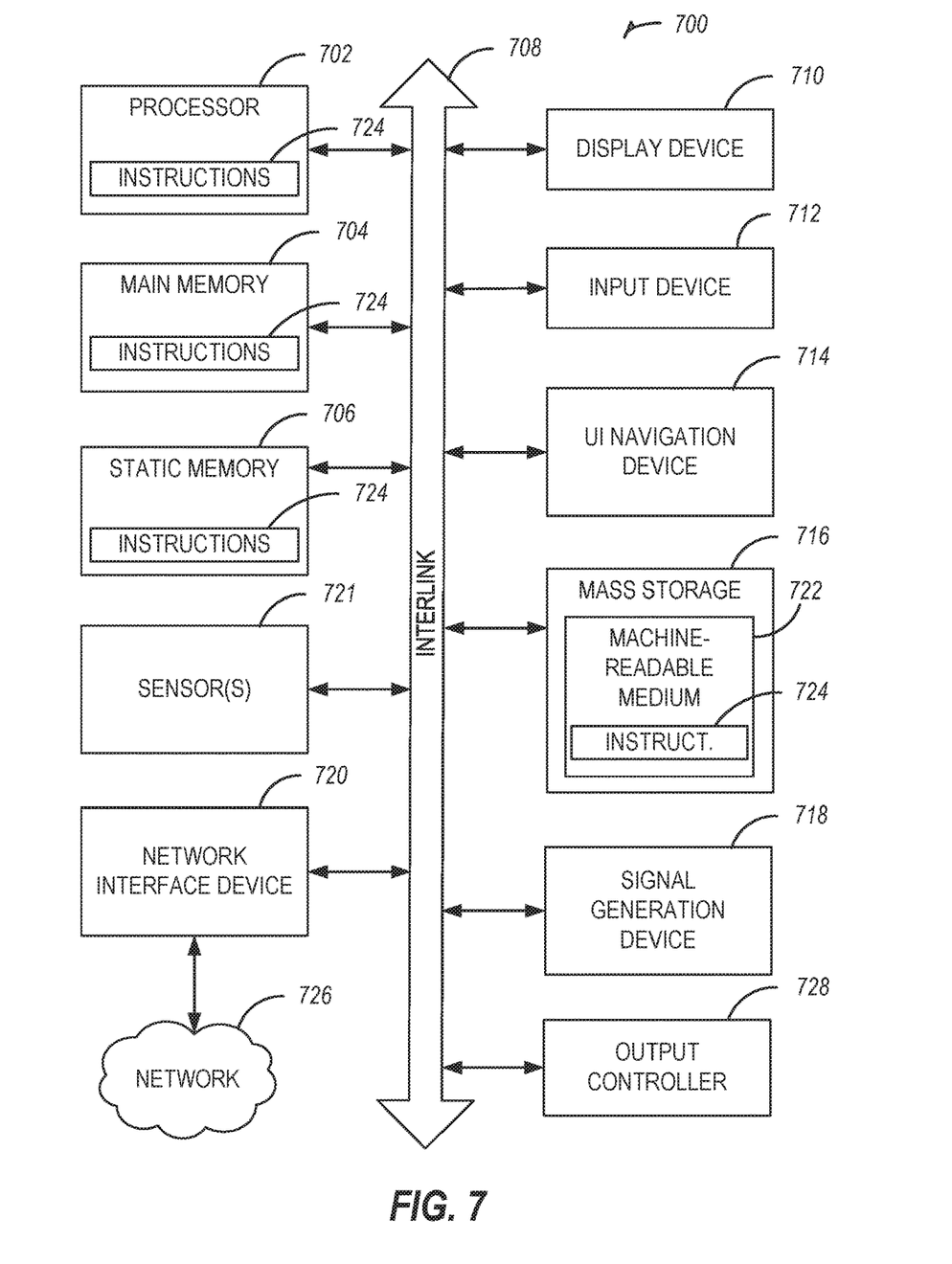
FIG. 7 illustrates generally an example of a block diagram of a machine upon which any one or more of the techniques (e.g., methodologies) discussed herein may perform in accordance with some embodiments.

FIG. 7 illustrates generally an example of a block diagram of a machine 700 upon which any one or more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708.

The machine 700 may further include a display unit 710, an alphanumeric input device 712 (e.g., a keyboard), and a user interface (UI) navigation device 714 (e.g., a mouse). In an example, the display unit 710, alphanumeric input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 that is non-transitory on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Various Notes & Examples

Each of these non-limiting examples may stand on its own, or may be combined in various permutations or combinations with one or more of the other examples.

Example 1 is a method for securely booting multiple devices comprising: initiating a boot sequence at a first device in an array of identical devices; booting a first distributed boot executive (DBE) on the first device; updating a Platform Configuration Register (PCR) with a first boot measurement; sharing the first boot measurement with a second DBE on a second device of the identical devices before booting a next boot step at the first device; receiving a second boot measurement from the second DBE; and booting the first device into a next boot stage in response to receiving the second boot measurement from the second DBE.

In Example 2, the subject matter of Example 1 optionally includes comparing the second boot measurement to a local whitelist to determine whether the second boot measurement is valid.

In Example 3, the subject matter of Example 2 optionally includes wherein booting the first device into the next boot stage includes booting the first device in to the next boot stage in response to determining that the second boot measurement is valid.

In Example 4, the subject matter of any one or more of Examples 2-3 optionally include wherein determining whether the second boot measurement is valid includes verifying a signature of the second boot measurement by accessing a global whitelist on a remote server.

In Example 5, the subject matter of Example 4 optionally includes wherein the global whitelist is stored on a blockchain.

In Example 6, the subject matter of Example 5 optionally includes writing the first boot measurement to the blockchain.

In Example 7, the subject matter of any one or more of Examples 2-6 optionally include removing the second device from a list of the identical devices stored at the first device in response to determining that the second boot measurement is invalid.

In Example 8, the subject matter of any one or more of Examples 1-7 optionally include signing the first boot measurement with a quoting key.

In Example 9, the subject matter of any one or more of Examples 1-8 optionally include wherein the first boot measurement is stored as a SHA-2 hash.

In Example 10, the subject matter of any one or more of Examples 1-9 optionally include wherein the second boot measurement and the first boot measurement correspond to an initial boot stage, the first device and the second device both having completed the initial boot stage and not having completed the next boot stage.

In Example 11, the subject matter of any one or more of Examples 1-10 optionally include comparing the first boot measurement to a local whitelist to determine whether the first boot measurement is valid and wherein sharing the first boot measurement with the second DBE includes sharing the first boot measurement in response to determining that the first boot measurement is valid.

In Example 12, the subject matter of any one or more of Examples 1-11 optionally include wherein the DBE is implemented using a distributed computing coordination technique including at least one of a distributed ledger, a publish-subscribe technique, and a mesh technique.

In Example 13, the subject matter of any one or more of Examples 1-12 optionally include wherein the PCR stores the boot measurement as an immutable record.

In Example 14, the subject matter of any one or more of Examples 1-13 optionally include wherein booting the first device into the next boot stage includes booting the first device into the next boot stage in response to receiving a boot measurement from respective DBEs of all of the identical devices.

In Example 15, the subject matter of any one or more of Examples 1-14 optionally include wherein the identical devices are at least one of drones, cameras, industrial process control equipment, or Internet of Things (IoT) devices.

Example 16 is at least one machine-readable medium including instructions for operation of a computing system, which when executed by a machine, cause the machine to perform operations of any of the methods of Examples 1-15.

Example 17 is an apparatus comprising means for performing any of the methods of Examples 1-15.

Example 18 is a system for securely booting multiple devices comprising: at a first device of an array of identical devices to: initiate a boot sequence; boot a first distributed boot executive (DBE), the DBE to: update a Platform Configuration Register (PCR) with a first boot measurement; share the first boot measurement with a second DBE on a second device of the identical devices before booting a next boot step at the first device; receive a second boot measurement from the second DBE; and boot the first device into a next boot stale in response to receiving the second boot measurement from the second DBE.

In Example 19, the subject matter of Example 18 optionally includes wherein the DBE is further to compare the second boot measurement to a local whitelist to determine whether the second boot measurement is valid.

In Example 20, the subject matter of Example 19 optionally includes wherein to boot the first device into the next boot stage, the DBE is further to boot the first device in to the next boot stage in response to determining that the second boot measurement is valid.

In Example 21, the subject matter of any one or more of Examples 19-20 optionally include wherein to determine whether the second boot measurement is valid, the DBE is further to verify a signature of the second boot measurement by accessing a global whitelist on a remote server.

In Example 22, the subject matter of Example 21 optionally includes wherein the global whitelist is stored on a blockchain.

In Example 23, the subject matter of Example 22 optionally includes wherein the DBE is further to write the first boot measurement to the blockchain.

In Example 24, the subject matter of any one or more of Examples 19-23 optionally include wherein the DBE is further to remove the second device from a list of the identical devices stored at the first device in response to determining that the second boot measurement is invalid.

In Example 25, the subject matter of any one or more of Examples 18-24 optionally include wherein the DBE is further to sign the first boot measurement with a quoting key.

In Example 26, the subject matter of any one or more of Examples 18-25 optionally include wherein the first boot measurement is stored as a SHA-2 hash.

In Example 27, the subject matter of any one or more of Examples 18-26 optionally include wherein the second boot measurement and the first boot measurement correspond to an initial boot stage, the first device and the second device both having completed the initial boot stage and not having completed the next boot stage.

In Example 28, the subject matter of any one or more of Examples 18-27 optionally include wherein the DBE is further to compare the first boot measurement to a local whitelist to determine whether the first boot measurement is valid and wherein to share the first boot measurement with the second DBE, the DBE is further to share the first boot measurement in response to determining that the first boot measurement is valid.

In Example 29, the subject matter of any one or more of Examples 18-28 optionally include wherein the DBE is implemented using a distributed computing coordination technique including at least one of a distributed ledger, a publish-subscribe technique, and a mesh technique.

In Example 30, the subject matter of any one or more of Examples 18-29 optionally include wherein the PCR stores the boot measurement as an immutable record.

In Example 31, the subject matter of any one or more of Examples 18-30 optionally include wherein to boot the first device into the next boot stage, the DBE is further to boot the first device into the next boot stage in response to receiving a boot measurement from respective DBEs of all of the identical devices.

In Example 32, the subject matter of any one or more of Examples 18-31 optionally include wherein the identical devices are at least one of drones, cameras, industrial process control equipment, or Internet of Things (IoT) devices.

Example 33 is an apparatus for securely booting multiple devices comprising: means for initiating a boot sequence at a first device in an array of identical devices; means for booting a first distributed boot executive (DBE) on the first device; means for updating a Platform Configuration Register (PCR) with a first boot measurement; means for sharing the first boot measurement with a second DBE on a second device of the identical devices before booting a next boot step at the first device; means for receiving a second boot measurement from the second DBE; and means for booting the first device into a next boot stage in response to receiving the second boot measurement from the second DBE.

In Example 34, the subject matter of Example 33 optionally includes means for comparing the second boot measurement to a local whitelist to determine whether the second boot measurement is valid.

In Example 35, the subject matter of Example 34 optionally includes wherein the means for booting the first device into the next boot stage include means for booting the first device in to the next boot stage in response to determining that the second boot measurement is valid.

In Example 36, the subject matter of any one or more of Examples 34-35 optionally include wherein the means for determining whether the second boot measurement is valid include means for verifying a signature of the second boot measurement by accessing a global whitelist on a remote server.

In Example 37, the subject matter of Example 36 optionally includes wherein the global whitelist is stored on a blockchain.

In Example 38, the subject matter of Example 37 optionally includes means for writing the first boot measurement to the blockchain.

In Example 39, the subject matter of any one or more of Examples 34-38 optionally include means for removing the second device from a list of the identical devices stored at the first device in response to determining that the second boot measurement is invalid.

In Example 40, the subject matter of any one or more of Examples 33-39 optionally include means for signing the first boot measurement with a quoting key.

In Example 41, the subject matter of any one or more of Examples 33-40 optionally include wherein the first boot measurement is stored as a SHA-2 hash.

In Example 42, the subject matter of any one or more of Examples 33-41 optionally include wherein the second boot measurement and the first boot measurement correspond to an initial boot stage, the first device and the second device both having completed the initial boot stage and not having completed the next boot stage.

In Example 43, the subject matter of any one or more of Examples 33-42 optionally include means for comparing the first boot measurement to a local whitelist to determine whether the first boot measurement is valid and wherein the means for sharing the first boot measurement with the second DBE include means for sharing the first boot measurement in response to determining that the first boot measurement is valid.

In Example 44, the subject matter of any one or more of Examples 33-43 optionally include wherein the DBE is implemented using a distributed computing coordination technique including at least one of a distributed ledger, a publish-subscribe technique, and a mesh technique.

In Example 45, the subject matter of any one or more of Examples 33-44 optionally include wherein the PCR stores the boot measurement as an immutable record.

In Example 46, the subject matter of any one or more of Examples 33-45 optionally include wherein the means for booting the first device into the next boot stage include means for booting the first device into the next boot stage in response to receiving a boot measurement from respective DBEs of all of the identical devices.

In Example 47, the subject matter of any one or more of Examples 33-46 optionally include wherein the identical devices are at least one of drones, cameras, industrial process control equipment, or Internet of Things (IoT) devices.

Example 48 is at least one machine-readable medium including instructions for securely booting multiple devices, which when executed by a machine, cause the machine to: initiate a boot sequence at a first device in an array of identical devices; boot a first distributed boot executive (DBE) on the first device; update a Platform Configuration Register (PCR) with a first boot measurement; share the first boot measurement with a second DBE on a second device of the identical devices before booting a next boot step at the first device; receive a second boot measurement from the second DBE; and boot the first device into a next boot stage in response to receiving the second boot measurement from the second DBE.

In Example 49, the subject matter of Example 48 optionally includes instructions to compare the second boot measurement to a local whitelist to determine whether the second boot measurement is valid.

In Example 50, the subject matter of Example 49 optionally includes wherein the instructions to boot the first device into the next boot stage include instructions to boot the first device in to the next boot stage in response to determining that the second boot measurement is valid.

In Example 51, the subject matter of any one or more of Examples 49-50 optionally include wherein the instructions to determine whether the second boot measurement is valid include instructions to verify a signature of the second boot measurement by accessing a global whitelist on a remote server.

In Example 52, the subject matter of Example 51 optionally includes wherein the global whitelist is stored on a blockchain.

In Example 53, the subject matter of Example 52 optionally includes instructions to write the first boot measurement to the blockchain.

In Example 54, the subject matter of any one or more of Examples 49-53 optionally include instructions to remove the second device from a list of the identical devices stored at the first device in response to determining that the second boot measurement is invalid.

In Example 55, the subject matter of any one or more of Examples 48-54 optionally include instructions to sign the first boot measurement with a quoting key.

In Example 56, the subject matter of any one or more of Examples 48-55 optionally include wherein the first boot measurement is stored as a SHA-2 hash.

In Example 57, the subject matter of any one or more of Examples 48-56 optionally include wherein the second boot measurement and the first boot measurement correspond to an initial boot stage, the first device and the second device both having completed the initial boot stage and not having completed the next boot stage.

In Example 58, the subject matter of any one or more of Examples 48-57 optionally include instructions to compare the first boot measurement to a local whitelist to determine whether the first boot measurement is valid and wherein the instructions to share the first boot measurement with the second DBE include instructions to share the first boot measurement in response to determining that the first boot measurement is valid.

In Example 59, the subject matter of any one or more of Examples 48-58 optionally include wherein the DBE is implemented using a distributed computing coordination technique including at least one of a distributed ledger, a publish-subscribe technique, and a mesh technique.

In Example 60, the subject matter of any one or more of Examples 48-59 optionally include wherein the PCR stores the boot measurement as an immutable record.

In Example 61, the subject matter of any one or more of Examples 48-60 optionally include wherein the instructions to boot the first device into the next boot stage include instructions to boot the first device into the next boot stage in response to receiving a boot measurement from respective DBEs of all of the identical devices.

In Example 62, the subject matter of any one or more of Examples 48-61 optionally include wherein the identical devices are at least one of drones, cameras, industrial process control equipment, or Internet of Things (IoT) devices.

Example 63 is a system configured to perform operations of any one or more of Examples 1-62.

Example 64 is a method for performing operations of any one or more of Examples 1-62.

Example 65 is a machine readable medium including instructions that, when executed by a machine cause the machine to perform the operations of any one or more of Examples 1-62.

Example 66 is a system comprising means for performing the operations of any one or more of Examples 1-62.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system for securely booting multiple devices comprising:
   processing circuitry of a first device of an array of devices to:
   initiate a boot sequence; and
   boot a first distributed boot executive (DBE), the processing circuitry to cause the first DBE to:
   update a Platform Configuration Register (PCR) with a first boot measurement;
   share the first boot measurement with a second DBE on a second device of the devices before booting a next boot stage at the first device;
   receive a second boot measurement from the second DBE;
   boot the first device into the next boot stage in response to receiving the second boot measurement from the second DBE; and
   in response to booting the first device into the next boot stage, prevent the first device from initiating a boot stage that follows the next boot stage in the boot sequence until a successful boot confirmation is received from the second device, the successful boot confirmation indicating the second device has booted into the next boot stage.

2. The system of claim 1, wherein the processing circuity further causes the first DBE to compare the second boot measurement to a local whitelist to determine whether the second boot measurement is valid.

3. The system of claim 2, wherein to boot the first device into the next boot stage, the first DBE is further to boot the first device into the next boot stage in response to determining that the second boot measurement is valid.

4. The system of claim 2, wherein to determine whether the second boot measurement is valid, the processing circuitry is further to cause the first DBE to verify a signature of the second boot measurement.

5. The system of claim 2, wherein the local whitelist includes a blockchain.

6. The system of claim 5, wherein the processing circuitry is further to write the first boot measurement to the blockchain.

7. The system of claim 2, wherein the processing circuitry is further to cause the first DBE to remove the second device from a list of the devices stored at the first device in response to determining that the second boot measurement is invalid.

8. The system of claim 1, wherein the processing circuitry is further to cause the first DBE to sign the first boot measurement with a quoting key.

9. The system of claim 1, wherein the first boot measurement is stored as a SHA-2 hash.

10. The system of claim 1, wherein the second boot measurement and the first boot measurement correspond to an initial boot stage, the first device and the second device both having completed the initial boot stage and not having completed the next boot stage.

11. The system of claim 1, wherein the processing circuitry is further to cause the first DBE to compare the first boot measurement to a local whitelist to determine whether the first boot measurement is valid and wherein to share the first boot measurement with the second DBE, the processing circuitry further to cause the first DBE to share the first boot measurement in response to determining that the first boot measurement is valid.

12. The system of claim 1, wherein the first DBE is implemented using a distributed computing coordination technique including at least one of a distributed ledger, a publish-subscribe technique, and a mesh technique.

13. The system of claim 1, wherein the PCR stores the first boot measurement as an immutable record.

14. The system of claim 1, wherein to boot the first device into the next boot stage, the processing circuitry is further to cause the first DBE to boot the first device into the next boot stage in response to receiving a boot measurement from respective DBEs of all of the devices.

15. The system of claim 1, wherein the devices are at least one of drones, cameras, industrial process control equipment, or Internet of Things (IoT) devices.

16. A method for securely booting multiple devices comprising:
    initiating, using processing circuitry of a first device, a boot sequence at the first device in an array of devices;
    booting, using the processing circuitry, a first distributed boot executive (DBE) on the first device;
    updating, using the processing circuitry, a Platform Configuration Register (PCR) with a first boot measurement;
    sharing, using the processing circuitry, the first boot measurement with a second DBE on a second device of the devices before booting a next boot stage at the first device;
    receiving, using the processing circuitry, a second boot measurement from the second DBE;
    booting, using the processing circuitry, the first device into the next boot stage in response to receiving the second boot measurement from the second DBE; and
    in response to booting the first device into the next boot stage, preventing, using the processing circuitry, the first device from initiating a boot stage that follows the next boot stage in the boot sequence until a successful boot confirmation is received from the second device, the successful boot confirmation indicating the second device has booted into the next boot stage.

17. The method of claim 16, further comprising comparing, using the processing circuitry, the second boot measurement to a local whitelist to determine whether the second boot measurement is valid.

18. The method of claim 17, wherein booting the first device into the next boot stage includes booting, using the processing circuitry, the first device into the next boot stage in response to determining that the second boot measurement is valid.

19. The method of claim 17, wherein determining whether the second boot measurement is valid includes verifying, using the processing circuitry, a signature of the second boot measurement.

20. The method of claim 17, wherein the local whitelist includes a blockchain.

21. The method of claim 20, further comprising writing, using the processing circuitry, the first boot measurement to the blockchain.

22. The method of claim 17, further comprising removing, using the processing circuitry, the second device from a list of the devices stored at the first device in response to determining that the second boot measurement is invalid.

23. At least one non-transitory machine-readable medium including instructions for securely booting multiple devices, which when executed by a machine, cause the machine to:
    initiate a boot sequence at a first device in an array of devices;
    boot a first distributed boot executive (DBE) on the first device;
    update a Platform Configuration Register (PCR) with a first boot measurement;
    share the first boot measurement with a second DBE on a second device of the devices before booting a next boot stage at the first device;
    receive a second boot measurement from the second DBE;
    boot the first device into the next boot stage in response to receiving the second boot measurement from the second DBE; and
    in response to booting the first device into the next boot stage, prevent the first device from initiating a boot stage that follows the next boot stage in the boot sequence until a successful boot confirmation is received from the second device, the successful boot confirmation indicating the second device has booted into the next boot stage.

24. The at least one non-transitory machine-readable medium of claim 23, further comprising instructions to compare the second boot measurement to a local whitelist to determine whether the second boot measurement is valid.

25. The at least one non-transitory machine-readable medium of claim 24, wherein the instructions to boot the first device into the next boot stage include instructions to boot the first device into the next boot stage in response to determining that the second boot measurement is valid.

* * * * *